United States Patent [19]
Milton

[11] 3,789,787
[45] Feb. 5, 1974

[54] METHOD OF MANUFACTURING A GEARSHIFT AND DETENT PLATE BRACKET

[76] Inventor: Thomas J. Milton, 313 Cornell St., Bay City, Mich. 48706

[22] Filed: Jan. 26, 1973

[21] Appl. No.: 326,796

Related U.S. Application Data

[62] Division of Ser. No. 194,173, Nov. 1, 1971, Pat. No. 3,748,921.

[52] U.S. Cl............................................. 113/116 R
[51] Int. Cl............................................. B21d 53/88
[58] Field of Search...113/116 R, 116 F, 116 HA, 113/116 AA; 74/484, 485, 486, 473 SW

[56] References Cited
UNITED STATES PATENTS

| 1,644,261 | 10/1927 | Marles | 113/116 AA |
| 3,008,441 | 11/1961 | Schonitzer | 113/116 R |
| 3,527,116 | 9/1970 | Kimberlin | 74/484 |
| 3,529,344 | 9/1970 | Pitner | 113/116 R |

Primary Examiner—Richard J. Herbst
Attorney, Agent, or Firm—John P. Moran

[57] ABSTRACT

The steering column-mounted shift mechanism shown includes a rotatable stamped shroud secured to a stamped gearshift and detent plate bracket which, in turn, is operatively connected to the usual shift or control tube. The bracket is formed from a flat blank to include a pair of spaced end rings with an interconnecting strap member and having a support for the pivotal mounting of a shift lever formed on a side of one of the end rings and a bracket with a pair of arcuate mounting flanges formed on a side of the other end ring in spaced parallel relationship. The arcuate flanges are secured to an inner surface of the shroud and one of the flanges includes notches suitable for cooperation with a sliding rack of the usual steering column lock system. A shift lever biasing spring is mounted through an opening in the bracket and retained at one end against the shift lever pivotal mounting support. This arrangement is adaptable for use with either an automatic or a synchromesh transmission.

2 Claims, 10 Drawing Figures

PATENTED FEB 5 1974 3,789,787
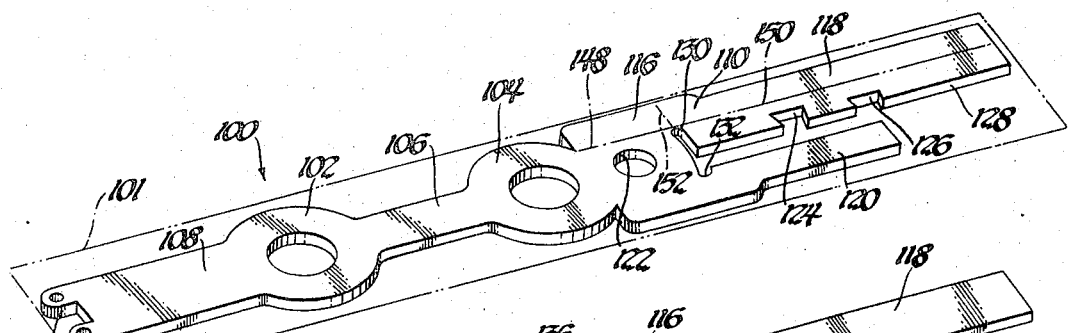
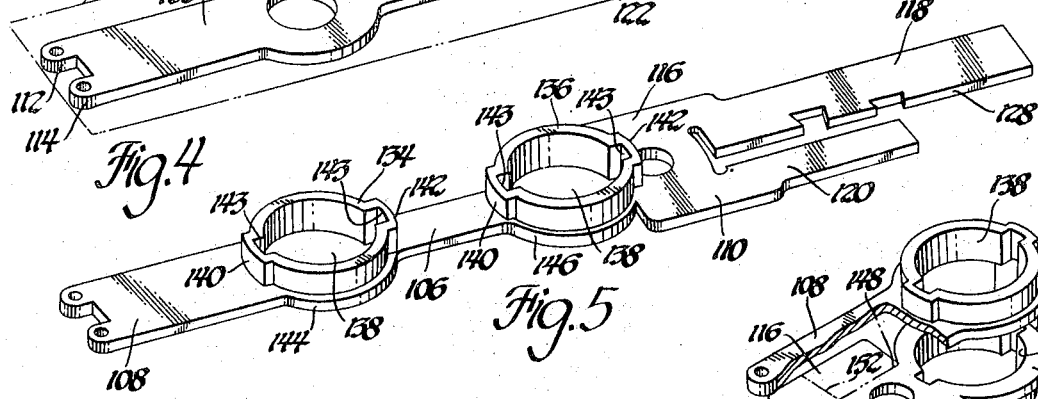
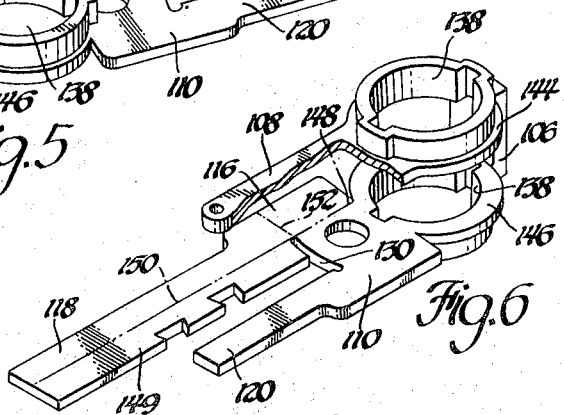
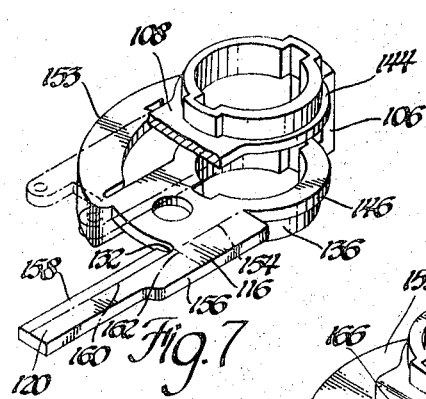
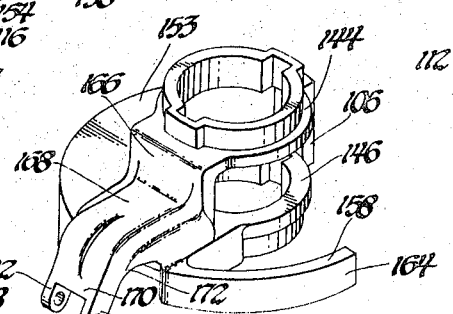
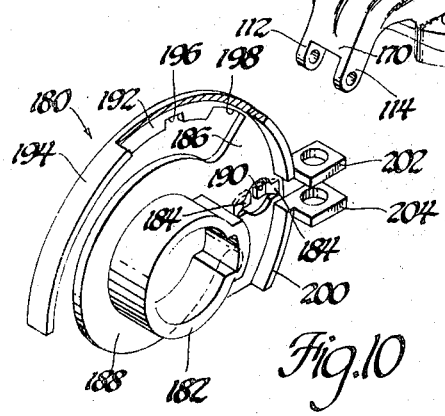

METHOD OF MANUFACTURING A GEARSHIFT AND DETENT PLATE BRACKET

This is a division of pending application Ser. No. 194,173, filed Nov. 1, 1971, now U.S. Pat. No. 3,748,921.

This invention relates generally to transmission shift controls and, more particularly, to a steering column-mounted shift control.

An object of the invention is to provide an improved and simplified column-mounted gearshift bowl assembly which provides for efficient manual rotary movement of the entire assembly and relative axial movement of a shift tube and cooperating gearshift and detent plate bracket when required.

Another object of the invention is to provide a gearshift and detent plate bracket formed in a simplified one-piece configuration for operatively linking a shift shroud and shift tube together and providing for the pivotal mounting thereon of a shift lever.

A further object of the invention is to provide such a one-piece bracket which may be used in conjunction with either an automatic or a synchromesh transmission.

These and other objects and advantages of the invention will be apparent when reference is made to the following description and accompanying drawings, wherein:

FIGS. 4-9 are perspective views of the steps involved in the method of forming a portion of the FIG. 1 structure; and FIG. 10 is a perspective view of an alternate embodiment of a portion of the FIG. 1 structure.

Figure 1:
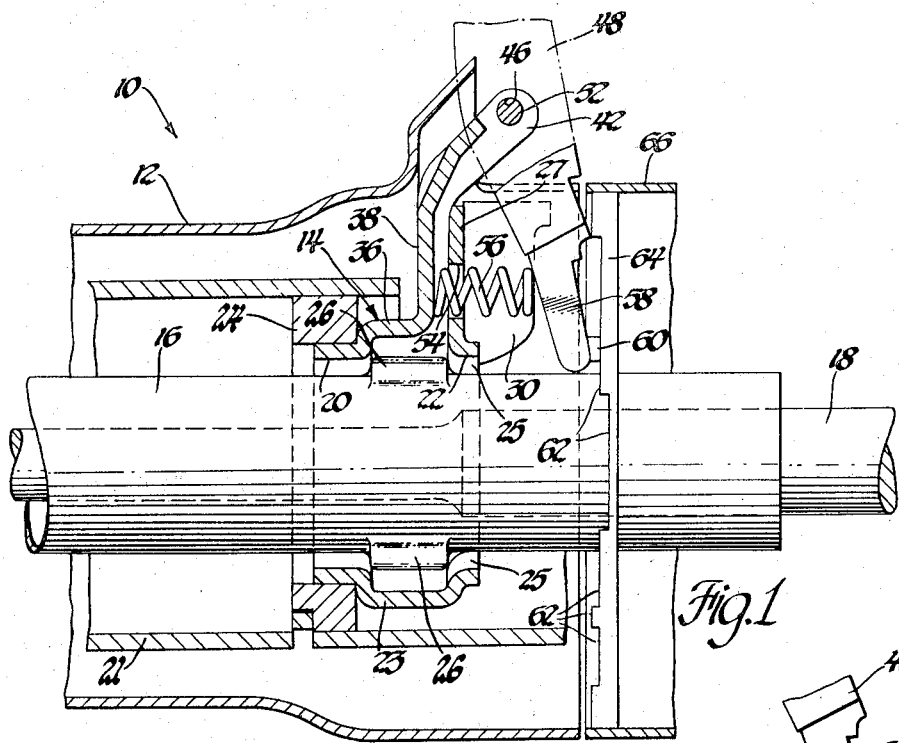
FIG. 1 is a fragmentary cross-sectional view of a column-mounted transmission shift mechanism embodying the invention.
Figure 2:
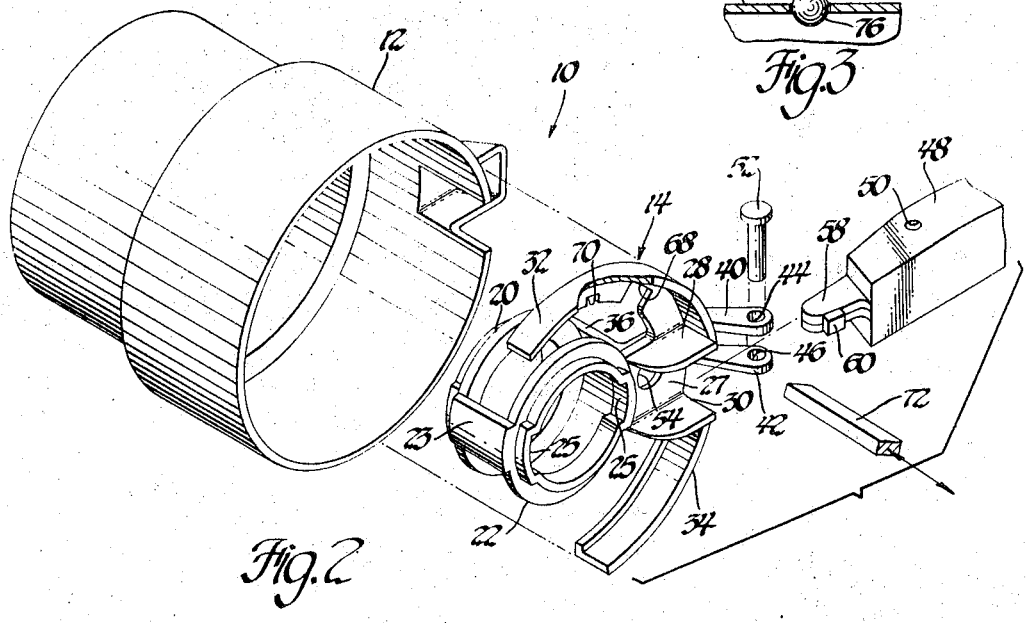
FIG. 2 is a perspective view of disassembled portions of the FIG. 1 structure.

Referring now to FIGS. 1 and 2 in greater detail, a column-mounted gearshift bowl assembly 10 includes a stamped cylindrical shift shroud 12 which is mounted concentrically around a gearshift and detent plate bracket 14. The stamped bracket 14 is secured around the usual shift or control tube 16, the latter being mounted concentrically around the usual steering shaft 18 and operatively connected to the transmission (not shown) in the conventional manner. The shift bracket 14 includes dual spaced end ring members 20 and 22, interconnected by a strap or spacer 23, the ring 20 being retained axially and rotatably mounted within a mounting ring 24 (FIG. 1). The mounting ring 24 is secured to a steering column jacket 21, the control tube 16 being rotatably mounted within jacket 21.

Oppositely disposed aligned slots 25 are formed along the inner peripheries of the rings 20 and 22 for cooperation with oppositely disposed ridges or keys 26 formed on the shift tube 16 to provide rotary movement of the shift tube 16 in response to rotary movement of the bracket 14.

A transverse extension or bracket 27 is formed on the ring 22 opposite the connector strap 23 and extending outwardly with respect to the axis of the ring members 20 and 22. A pair of spaced walls 28 and 30 are formed adjacent the side edges on the extension 27, extending axially away from the plane of the ring member 22. A pair of arcuate flanges 32 and 34 (FIG. 2) are formed on the outermost ends of the walls 28 and 30, respectively, generally wrapping around the ring member 22. The shroud 12 is secured to the outer surfaces of the flanges 32 and 34 by any suitable means, such as welding.

A support flange 36 (FIG. 1) is formed on the ring member 20 opposite the connector strap 23, extending toward the ring member 22. A second transverse extension or bracket 38 is formed on the end of the support flange 36, spaced apart from and parallel to the extension 27. A pair of spaced mounting projections 40 and 42 having aligned openings 44 and 46, respectively, formed therethrough, are formed on the outermost end of the transverse extension 28. A shift lever 48 is pivotally mounted between the projections 40 and 42, the lever 48 having an opening 50 formed therein for alignment with the openings 44 and 46 for the insertion therethrough of a pivot pin 52 (FIG. 2). An opening 54 is formed in the first transverse extension 27, intermediate the walls 28 and 30. A coil spring 56 (FIG. 1) is mounted through the opening 54 with one end thereof seated on the second extension 38 and the other end thereof urging an inner end projection 58 formed on the lever 48 to the right in FIG. 1, about the pivot pin 52, urging a boss 60 formed on the opposite side thereof into mesh with a particular drive ratio level or notch position 62 formed on an adjacent gate plate 64 secured to a fixed upper housing 66 when used in conjunction with an automatic transmission. Such levels or notches 62 retain the shift tube 16 in the desired circumferential position once the shift lever 48 has been manually released.

A pair of notches 68 and 70 (FIG. 2) are formed in the arcuate flange 32 providing PARK and NEUTRAL connection means for cooperation with a sliding rack member of the usual steering column lock system, one or the other of the notches 68 and 70 being engaged thereby during the start-up operation. The sliding rack member is represented generally by the member 72 in FIG. 2 and serves to engage the notch 68 when starting the engine with the lever 48 in the PARK position, and to engage the notch 70 when starting the engine with the lever 48 in the NEUTRAL position.

Figure 3:
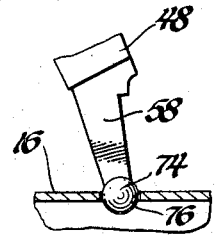
FIG. 3 is a fragmentary cross-sectional view showing a modification of a portion of the FIG. 1 structure.

As illustrated in FIG. 3, when a synchromesh transmission is employed, it is necessary to merely add a ball-end 74 to the shift lever projection 58. The ball-end 74 extends into a cut-out or slot 76 formed in the shift tube 16, thus being able to both selectively rotate the shift tube 16 for the desired LOW, DRIVE and REVERSE ratios and to move the shift tube 16 axially for NEUTRAL. Axial movement of the shift tube 16 is possible relative to the bracket 14 by virtue of the ridges or keys 26 on the shift tube 16 being slidably mounted in the axial slots 25 formed in the bracket 14.

It may be noted that the gearshift and detent plate bracket 14 is formed as one piece. The method by which this is accomplished is illustrated in FIGS. 4-9 and embodies a continuous strip cycle on a four-slide forming machine. Specifically, a blank 100 (FIG. 4) having a predetermined shape is first stamped from a piece of flat stock represented by the outline identified as 101. The blank 100 inclues two washer-like portions 102 and 104 interconnected by a narrow strip 106 and two selectively contoured end strips 108 and 110 extending in opposite directions from the washer-like portions 102 and 104, respectively. A pair of apertured tabs 112 and 114 are formed on the end of the strip 108. The strip 110 includes a wide section 116 adjacent the washer-like portion 104, and two leg portions 118 and 120 extending from the wide section 116. An opening 122 is formed through the wide section. A pair of notches 124 and 126 are formed in the leg portion 118 at the inner edge 128 thereof adjacent the other leg portion 120. A slit 130 is formed intermediate the leg portion 118 and the wide section 116 off the inner edge 128. A relief notch 132 is formed on the leg portion 120 opposite the slit 130.

As a second step (FIG. 5), the washer-like portions 102 and 104 are formed outwardly from the initial flat surface, to include respective cylindrical portions 134 and 136, each having a central opening 138 and oppositely disposed longitudinal protrusions 140 and 142 formed thereon. Each of the protrusions 140 and 142 forms an inner retainer slot 143. The outer peripheral portions of the washer-like portions 102 and 104 remain as collars 144 and 146, respectively.

In the third step (FIG. 6), the blank 100 is folded at the central strip 106 such that the central openings 138 are axially aligned and spaced apart the length of the strip 106 which bridges the collars 144 and 146. The end strips 108 and 110 now extend in the same direction, parallel to one another.

The larger leg portion 118 and the wider section 116 of the end strip 110 are next folded along a line, represented in FIGS. 4 and 6 as 148, extending along the wider section 116 intermediate the innermost end of the slit 130 and the collar 146. The notched side or edge portion 149 (FIG. 6) of the leg portion 118 is then folded outwardly along a central longitudinal line thereof represented in FIGS. 4 and 6 as 150. The leg portion 118 is then wrapped around the cylindrical portion 136, bending from a line 152 shown in FIGS. 4 and 6 as an extension of the slit 130, and formed into an arcuate member 153 (FIG. 7), with the edge portion 149 constituting a relatively wide notched flange thereof.

The wider section 116 is then folded along the line 154 (FIG. 7) extending from the inner edge of the relief notch 132 and the collar 146, such that the outer edge portion 156 of the section 116 extends downwardly in FIGS. 7 and 8, causing the leg portion 120 to attain a vertical attitude. Next, the upper edge portion 158 of the now vertical leg portion 120 is folded outwardly along the line 160 (FIG. 7). Then the leg portion 120 is bent about a transverse line 162 (FIG. 7) and formed into an arcuate member 164 (FIG. 8), with the upper edge portion 158 constituting a flange thereof.

As a final step in the forming process, the end strip 108 (FIG. 8) is then formed to include a first vertical section 166 (FIG. 9), a second substantially horizontal section 168 parallel to the central horizontal portion of the original wide section 116 remaining between the lines 148 (FIG. 4) and 154 (FIG. 7), and terminating in a downwardly sloping section 170, with downwardly extending side walls 172 being formed along the full length of the sections 166, 168 and 170, causing the apertured end tabs 112 and 114 (FIG. 8) to assume the vertical parallel relationship shown in FIG. 9.

While several of the steps just discussed have been described as if several substeps were involved, it should be realized that at the respective stations the various substeps may all be formed simultaneously or in one continuous operation.

An alternate embodiment to the stamped bracket 14 of FIGS. 2 and 9 is the bracket 180 illustrated in FIG. 10. In the latter Figure it may be noted that a single cylindrical mounting hub 182 replaces the dual mounting ring 20/22 arrangement of FIG. 2. A pair of oppositely disposed tabs 184 are punched from a flat transverse bracket section 186 extending from a collar 188 formed on an end of the cylindrical mounting hub 182. The tabs 184 are bowed outwardly at their adjacent edges from the plane of the transverse bracket section 186 and an opening 190 is formed in the material remaining intermediate the tabs 184. Thus, a shift lever biasing spring comparable to the spring 56 may be mounted through the opening 190 and retained at one end thereof by the bowed-out tabs 184. An arcuate flange 192 having an arcuate wall segment 194 formed therearound is comparable to the arcuate flange 32 of the FIG. 2 embodiment. PARK and NEUTRAL notches 196 and 198, respectively, are formed in the flange 192. A wall segment 200 is formed along an edge of the bracket section 186 on the same circle as the arcuate wall segment 194 which continues around a portion of the bracket section 184. A pair of apertured lever mounting tabs 202 and 204 are formed on the adjacent ends of the wall segments 194 and 200, respectively.

OPERATION

Once the assembly and installation of the gearshift bowl assembly 10 has been completed for use with an automatic transmission, manual pivotal movement of the shift lever 48 in an axial direction about the pivot pin 52 against the force of the spring 56 releases the boss 60 on the protruded end 58 of the lever 48 from some one of the notches 62 of the fixed gate plate 64. Then, rotary movement of the shift lever 48 about the axis of the shift tube 16 rotates the shroud 12, the shift bracket 14 (or the shift bracket 180) and the shift tube 16 until the boss 60 on the lever 48 is positioned adjacent to and released into a different notch 62 of the gate plate 64 for the desired drive ratio, the shift tube 16 cooperating at its lower end with the levers (not shown) associated with the automatic transmission.

As previously indicated, when used to selectively control a synchromesh transmission, in lieu of a fixed gate plate 64, the lever 48 directly controls the rotary and axial movement of the shift tube 16 by means of the ball-end 74 thereof being mounted in the slot 76 formed in the shift tube 16. Axial movement of the shift tube 16 is limited by virtue of its lower end connection (not shown) with the synchromesh transmission.

It should be apparent that the invention provides an improved and highly efficient gearshift bowl assembly embodying a simplified stamped gearshift and detent plate bracket formed from a piece of flat stock which may be used with either an automatic or a synchromesh transmission.

While but two general embodiments of the invention have been shown and described, other modifications thereof are possible.

What I claim is:

1. A method of manufacturing a gearshift and detent plate bracket comprising the following steps:
   a. at a first station stamping a blank from a piece of flat stock, said blank including a pair of washer-like sections, a narrow strip interconnecting said washer-like sections, a pair of end strips extending in opposite directions from the respective washer-like sections, a pair of legs formed on the end of one of said end strips, and a pair of apertured tabs formed on the end of the other of said end strips;

b. at a second station forming a pair of cylindrical portions from said washer-like sections leaving a collar portion on the same plane as said blank and providing predetermined central openings;

c. at a third station bending said blank at the ends of said interconnecting strip such that said central openings are aligned and spaced apart a distance corresponding to the length of said interconnecting strip;

d. at a fourth station folding said one of said end strips so as to position one of said legs in a plane perpendicular to its starting plane; then folding said one of said legs on a line along the length thereof; and bending said one of said legs so as to assume an arcuate shape around one of said pair of cylindrical portions;

e. at a fifth station folding the other of said legs on a line along the length thereof; and forming said other of said legs so as to assume an arcuate shape around said one of said pair of cylindrical portions away from said one of said legs; and f. at a sixth station forming said second of said end strips so as to include a first portion parallel to said interconnecting strip, a second portion parallel to the plane of said other of said end strips, a third portion sloping away from said second portion, and side walls extending along the full length of said first, second and third portions terminating with said apertured tabs being axially aligned.

2. A method of manufacturing a gearshift and detent plate bracket for use with a column-mounted gearshift bowl assembly, said method comprising the following steps:

a. stamping a blank from a piece of flat stock, said blank including a pair of washer-shaped sections, a narrow strip interconnecting said washer-shaped sections, first and second end strips extending in opposite directions from said respective washer-shaped sections, a spring mounting opening in said first end strip, first and second leg members formed on the end of said first end strip, a pair of notches formed in one of said leg members, and a pair of tabs each having an aperture formed therein formed on the end of said second end strip;

b. forming a pair of similar cylindrical portions from said washer-shaped sections on the sides thereof opposite said interconnecting strip, each of said formed cylindrical portions leaving a collar on the same plane as said blank and providing similar predetermined central openings;

c. bending said blank at the ends of said interconnecting strip such that said similar central openings are aligned and spaced apart a distance corresponding to the length of said interconnecting strip;

d. folding said first end strip so as to position said first leg member in a plane perpendicular to its starting plane;

e. folding said first leg member on a line along the length thereof;

f. bending said folded first leg member so as to assume an arcuate position around one of said cylindrical portions;

g. folding said second leg member on a line along the length thereof;

h. forming said folded second leg member so as to assume an arcuate position around the other of said cylindrical portions; and i. forming said second end strip so as to include a first portion parallel to said interconnecting strip, a second portion parallel to the plane of said first end strip, a third portion sloping away from said second portion, and parallel side walls extending along the sides of said first, second and third portions and terminating with said pair of tabs having said apertures axially aligned.

* * * * *